June 20, 1944. G. J. WINTERMUTE ET AL 2,351,649
METHOD AND APPARATUS FOR CONTROLLING THE OPERATION OF LATHES
Filed Aug. 12, 1940 4 Sheets-Sheet 1
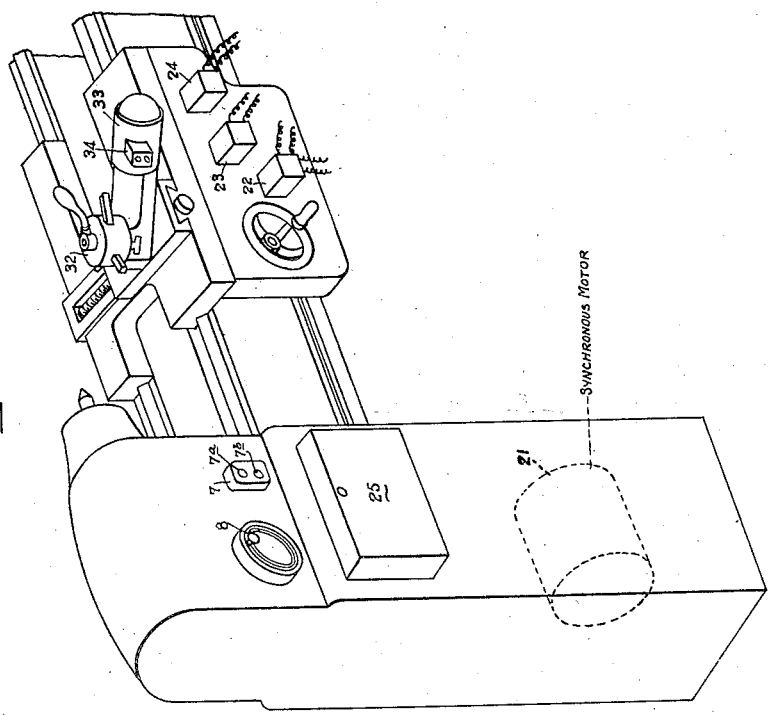
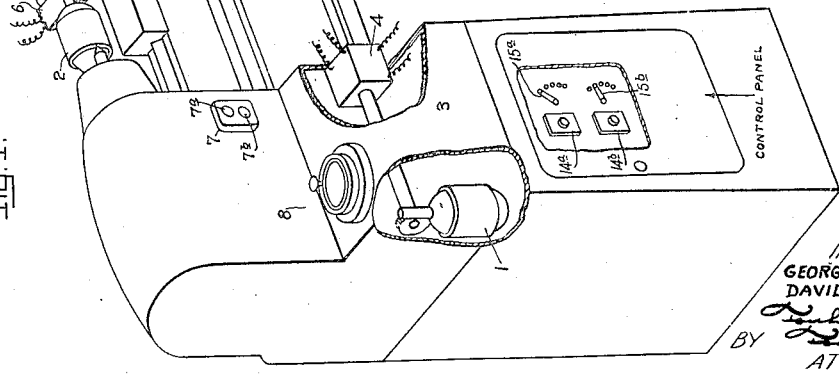
INVENTORS
GEORGE J. WINTERMUTE,
DAVID E. BENCH,
BY
ATTORNEYS June 20, 1944.   G. J. WINTERMUTE ET AL   2,351,649
METHOD AND APPARATUS FOR CONTROLLING THE OPERATION OF LATHES
Filed Aug. 12, 1940   4 Sheets-Sheet 2
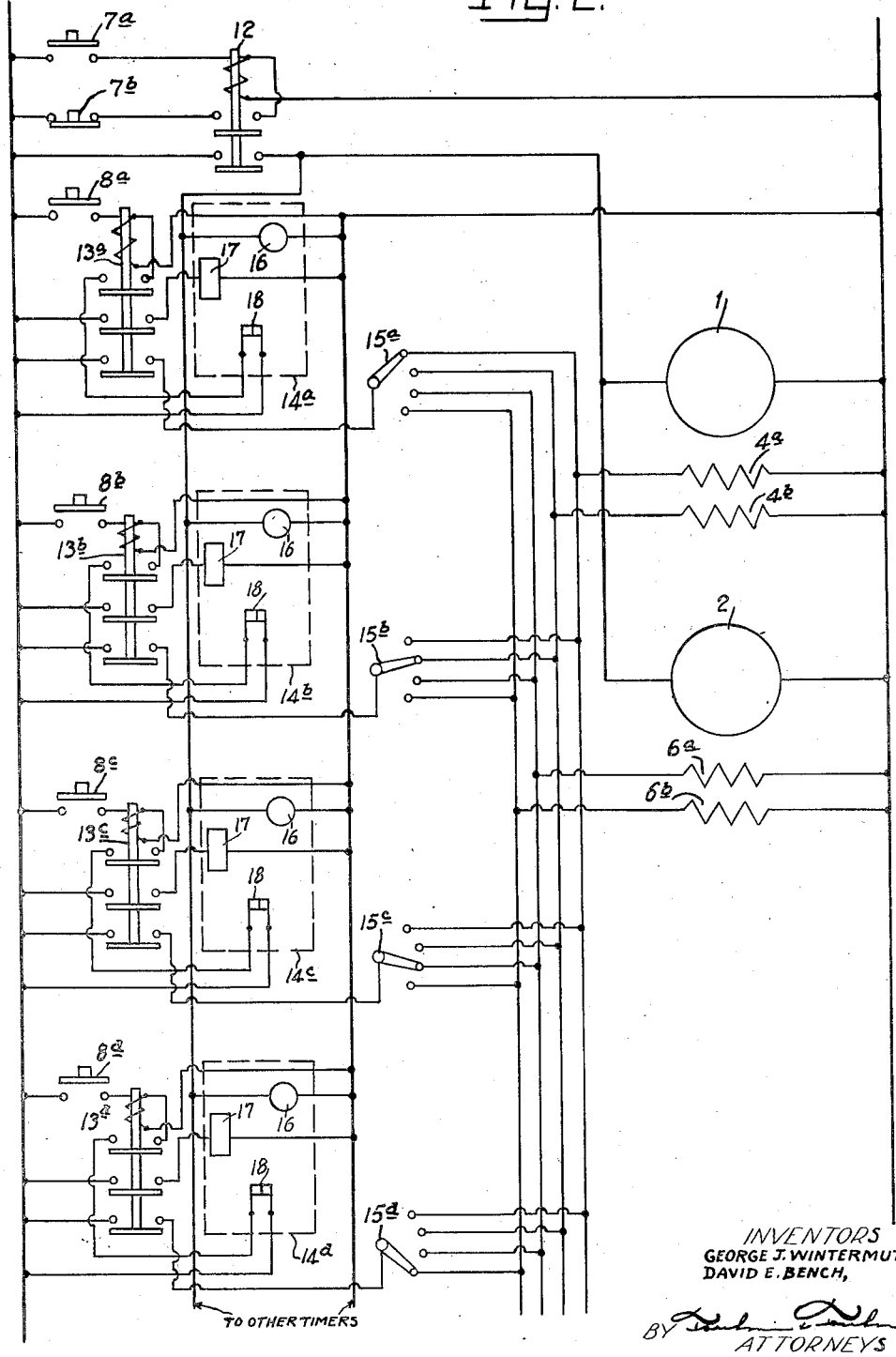
INVENTORS
GEORGE J. WINTERMUTE,
DAVID E. BENCH,
BY
ATTORNEYS

INVENTORS
GEORGE J. WINTERMUTE.
DAVID E. BENCH,
BY
ATTORNEYS

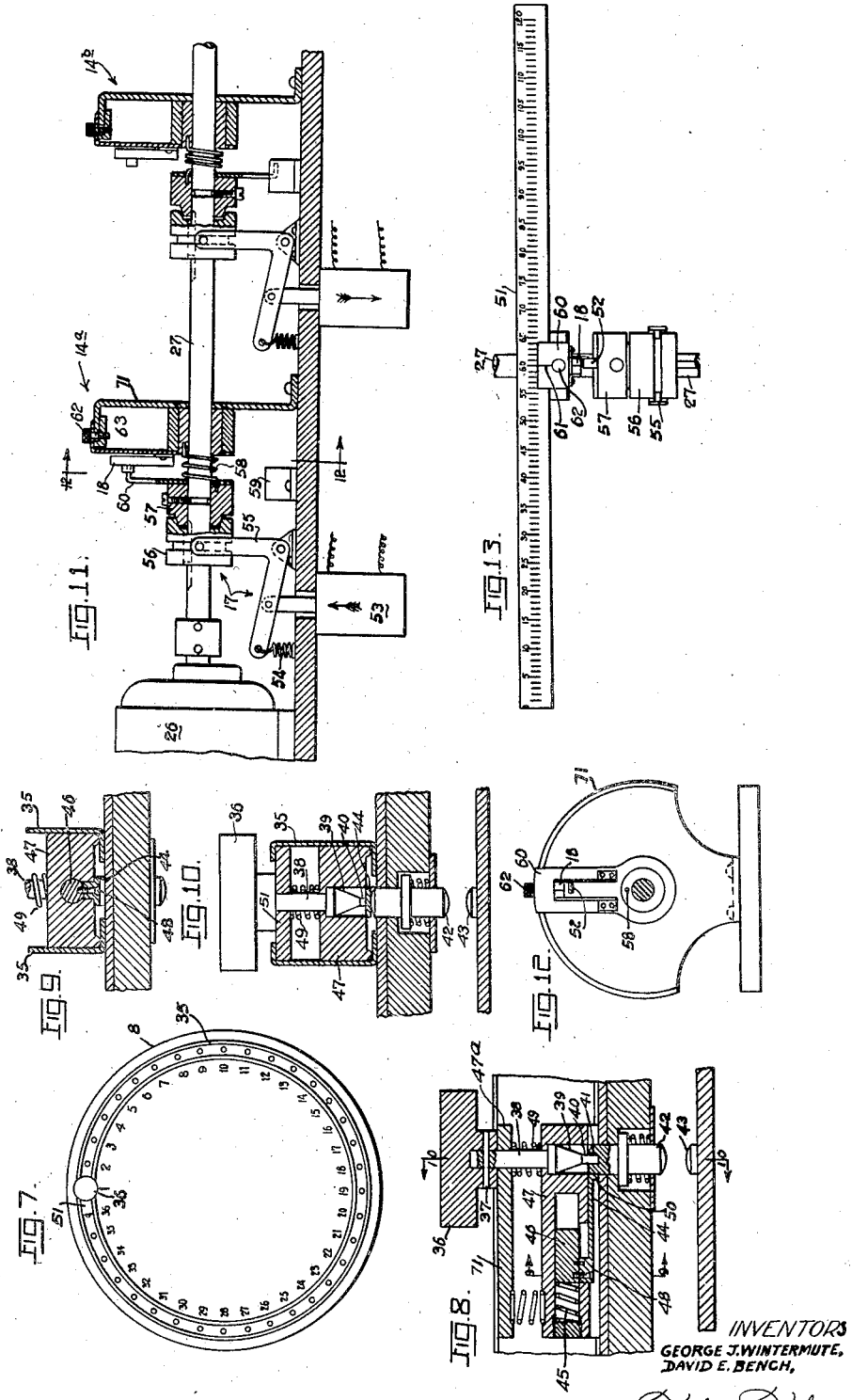

Patented June 20, 1944

2,351,649

UNITED STATES PATENT OFFICE 2,351,649

METHOD AND APPARATUS FOR CONTROLLING THE OPERATION OF LATHES

George J. Wintermute and David E. Bench, Dayton, Ohio, assignors to The Monarch Machine and Tool Company, Sidney, Ohio, a corporation of Ohio Application August 12, 1940, Serial No. 352,214

14 Claims. (Cl. 82—2)

This invention relates to a method and means of automatically operating lathes and similar mechanism.

It is the object of the invention to provide means of cutting work pieces of different sizes and diameters after once having established a predetermined timing for each successive operation to complete the work. With this timing data, the method and mechanism of this invention can be utilized.

It is the object of the invention to provide means of driving a carriage and cross slide for longitudinal and transverse cutting operations at a constant speed; to preselect the sequence of operations and of movements of the carriage and cross slide so that the cutting tool will perform the complete series of operations; and to preselect the time of each cutting operation so that after the tool has moved in a preselected direction for a predetermined time it can then either be manually or automatically switched to the next operation.

It is a further object of this invention to have the presetting of sequence of operations and the pretiming adjusted on the machine by a job setter and thereafter to provide a selector control by the operator of such simple character that operators of minimum skill may still operate lathes and other intricate mechanisms with the same success as the highest skilled machinist.

It is an object of this invention to take advantage of the fact that synchronous driving motors can be utilized either for individually driving the cross slide and carriage as well as the spindles or a master synchronous motor can be employed; and to take advantage of the fact that a synchronous electric motor will run at a constant speed irrespective of load and upon the attainment of an excessive load will simply stop. It is a further object to take advantage of the use of small synchronous timing motors for controlling the timing mechanism for making and breaking the electrical circuits which had been preselected by the job setter on the selector switches.

It is understood, that a job setter is not necessary and that any skilled machinist can perform the entire operation, but the advantage of using a common job setter for many lathes with operators for each lathe of minimum experience is indicated to show one of the advantages of this invention.

One of the chief advantages of this method of automatic lathe operation is that it reduces lathe control to an unskilled, push-button basis. In none of the modifications shown in the drawings, is any skilled operation on the part of the operator called for. This fact will become evident upon examination of the drawings and of the detailed description which follows.

Another advantage is that the work of the job setter is made quite simple. To determine the dimension of a cut accurately, he has merely to select the proper rate of speed, to divide this rate of speed into the desired dimension, and to set a timer accordingly. His work could be further facilitated by the making of charts on which ordinary dimensions are plotted against rates of speed in revolutions per second. In addition to setting a timer to control the dimension of each cut, the operator has only to position a selector switch which determines whether the tool will move longitudinally or transversely, and in a forward or reverse direction.

Because of the simplicity of the job setter's work, and also because this invention eliminates the grinding of special tools for every operation, it lends itself well to production where frequent and quick change-over from one job to another are required.

Lathe turning of all kinds can be done by the method herein presented; and this method is particularly adapted to the turning of such preformed pieces as forgings or castings, and to small pieces to be turned from bar stock.

An important indirect advantage of this timed method of lathe turning is that the total of the readings of the several timers can be used directly as a basis for figuring cost on the operation.

Referring to the drawings

Figure 1 is a diagrammatic view and perspective of a lathe showing one form of the invention in which separate synchronous motors are employed to drive the lead screw and cross-feed screw of a lathe, Figure 2 is an electrical circuit diagram for controlling the operation of the lathe as shown in Figure 1, Figure 3 is an electrical circuit diagram similar to Figure 2 but showing a modification of control in that it provides for full automatic operation of the lathe, Figure 4 is a diagrammatic view and perspective of a lathe showing a modified arrangement in which the main source of power for the lathe is a synchronous motor, Figure 5 is an electrical circuit diagram, similar to the diagrams of Figure 2 and 3, for operating the lathe as shown on Figure 4, Figure 6 shows still another form of electrical circuit in which a single timer is used to control all lathe cuts, Figure 7 is an elevation of the operator's control seen in Figures 1 and 4, Figure 8 is a section on line 8—8 of Figure 7 looking in the direction of the arrows, and showing the push button construction of the control.

Figure 9 is a detailed section on the line 9—9 of Figure 8 looking in the direction of the arrows, Figure 10 is another detailed section on the line 10—10 of Figure 8 looking in the direction of the arrows, Figure 11 is a diagrammatic view of a timing device having a plurality of individual timers, a single synchronous motor being used for all these individual timers.

Figure 12 is a section on the line 12—12 of Figure 11 looking in the direction of the arrows and showing, in elevation, the manual selector means by which the operator sets the period of each individual timer, Figure 13 is a plan view of one of the individual timing units shown in Figure 11, the indicator dial being shown in developed form.

Figure 5:
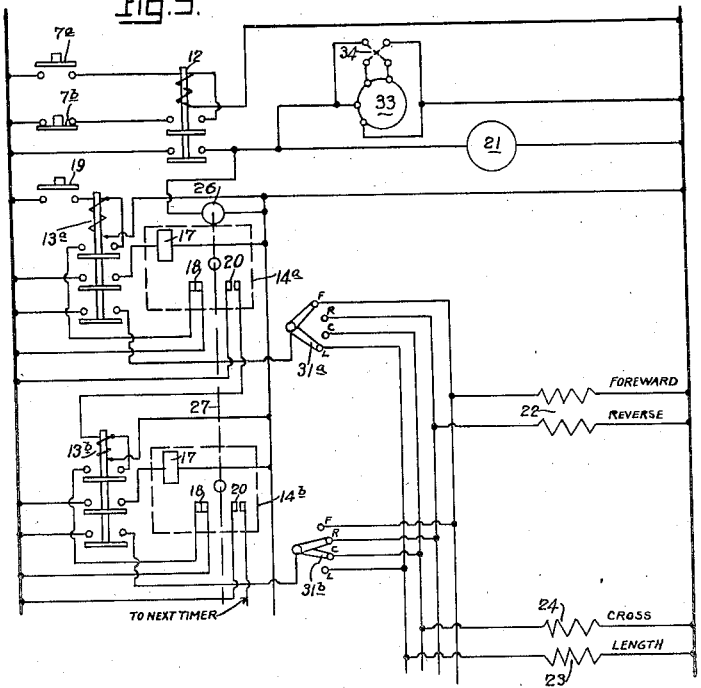

Referring to the drawings in detail, Figure 1 of the drawings shows an arrangement in which a synchronous motor 1 drives the lead screw of the lathe, and a synchronous motor 2 drives the cross-feed screw of the lathe. The first of these motors drives through the conventional gear box of the lathe, designated 3, and also through a magnetic reversing clutch 4. The lead screw may thus be driven by motor 1 throughout the range of speed provided by the gear box 3, and either in a forward or reverse direction.

The synchronous motor 2 is shown driving through a worm-wheel reducer 5 of a fixed ratio, to a reversing clutch 6, and then into the cross-feed screw, so that the cross slide may be operated at constant speed in either a forward or reverse direction.

The controls for the synchronous motors and the reversing clutches are shown at 7 and 8. Control station 7 consists of a start and stop push button for energizing motors 1 and 2. The device, designated 8, is a cycling controller by which the operator starts each motion of the tool whether longitudinally or transversely There is shown mounted on the tool rest a turret 9 in which a roughing and a finishing tool are held. Each of these tools is ground for both facing and turning. The roughing tool is intended to be put through a complete cutting cycle on, say, a cast work piece, after which the tool is returned to starting position by the operation of the usual handwheels 10 and 11. This starting position is determined by accurately located stop blocks, not shown on the sketch. To start the finishing cut, the operator unclamps the tool-holding turret and swings the finishing tool into operating position. He then operates the cycling controller 8 to put the lathe through the same cycle as before.

In the base of the lathe is shown a control panel which contains the timers and selectors which are correctly positioned by the job setter for each job.

An electrical circuit for the arrangement just described is shown in Figure 2. In the drawings, 1 is the synchronous motor connected to the lead screw; 2 is the synchronous motor connected to the cross-feed screw; 4a and 4b the coils of the magnetic clutch associated with the lead screw; 6a and 6b the coils of the magnetic clutch associated with the cross-feed screw; 7a the start button for motors 1 and 2, and 7b the stop button for these same motors; and 8a, 8b, 8c and 8d push buttons for starting each cutting motion of the tool. Actually, these push button switches 8a to 8d are one and the same, this button being movable from one cycling position to the next around a circular guide. The details of this cycling controller will be described later.

Associated with the push buttons 7a and 7b is a relay 12. Associated with the switches 8a to 8d are relays 13a to 13d. Also associated with switches 8a to 8d are timers 14a to 14d, and selector switches 15a to 15d.

Since each of the timer units is identical to the others, only the first will be described in detail. The timer 14a is of the type having a small synchronous motor, designated 16, a clutch 17 and contact points 18. The timing motor 16 is connected in parallel with the driving motors 1 and 2, and all three are connected independently of the timing system. These motors are set in motion by the operator before any cuts are taken on the work piece, so that they will all be running in synchronism. To do this, he presses the start button 7a which energizes the operating coil of relay 12. The upper blade of this relay immediately establishes a holding circuit for the relay, while the lower blade closes a circuit to the motors 16, 1 and 2. The operator may stop these motors, and consequently the operation of the entire lathe, by pressing the normally closed push button 7b, which is in series with the holding circuit of the relay 12.

With the feed motor and timer motors running, the operator is ready to start a work cycle (assuming that he has previously swung the tool into the predetermined starting position). Accordingly, he presses push button 8a establishing a circuit through the coil of relay 13a. The three blades of this relay are all normally open so that three circuits are closed upon the energization of the coil of the relay. The circuit established by the upper blade is through the contacts 18 of the timer 14a, and also through the coil of the relay, this circuit by-passing the push button 8a and permitting the operator to remove his finger from this button. The circuit established through the center contact is through the clutch 17 of the timer, the resultant energization of this clutch causing the motion of motor 16 to be transmitted through a trip (not shown) which, at the end of the predetermined time period, will open contact points 18. The circuit established through the lowermost contacts of relay 13a passes through selector switch 15a and through this switch to whichever of the reversing clutch coils 4a, 4b, 6a, or 6b the job setter has chosen.

The actuation of push button switch 8a thus accomplishes three things: first, it energizes the coil of the relay 13a and establishes a holding circuit for this coil through the contacts 18 of the timer; second, it initiates the cycling of the timer; third, it starts a feeding motion of the tool by actuating one of the reversing clutches to connect either the driving motor 1 or 2 to its feed screw. This condition of the circuit remains undisturbed until the timer signals that the traverse of the tool is completed, by opening contact points 18 and breaking the circuit through relay 13a. All of the contact blades of the relay then open, of course, so that the circuits which they control are all broken. The operator is now ready for the next cut, which he starts by pressing push button 8b. From this point on to the completion of the operation, the operation of the electrical controls is merely a repetition of that just described. Each of the timers 14a to 14d include a reset mechanism which, after the deenergization of clutch 17, puts the timer into condition for a new timing cycle.

The electrical circuit shown in Figure 3 is like that shown in Figure 2, except that it provides for full automatic operation of the lathe. That is, the circuit is designed to start all feed cuts of the lathe except the first one. The operator has merely to press the push button 19 once to start the first cut, and the timer which he thus sets in motion automatically starts the second cut when the first is completed. Likewise, the termination of the second cut is automatically followed by the beginning of the third, and so on.

This automatic feature is accomplished by the addition to each timer of normally open contact points 20, which are designed to be closed at the time that the normally closed contact points 18 are opened by the action of the timer motor 16 driving through the timer clutch 17. The contact points 20, it will be seen, replace the starting push button switches 8b to 8d of Figure 2.

Figure 6:
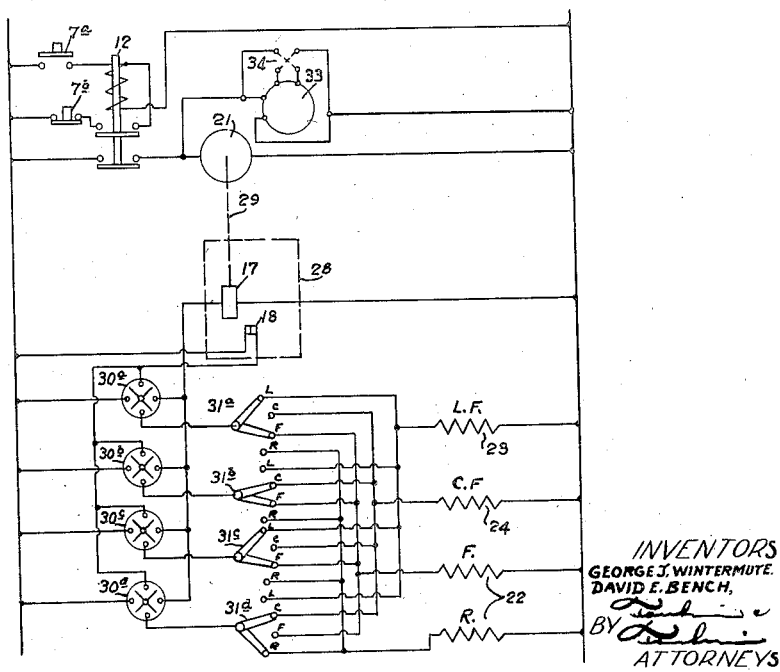

Figures 4, 5 and 6 show an arrangement in which very little change is made to the conventional lathe design. In fact, it is possible to convert conventional lathes into automatic timed lathes by the mechanism shown in these drawings. The usual driving motor is replaced by a synchronous motor of the same horsepower, this motor being indicated at 21. The hand controls, usually provided on the apron, are replaced by magnetic controls, numbered 22, 23 and 24. Magnetic control 22 is for operating the reversing clutch. Controls 23 and 24 are intended to actuate the length and cross-feed clutches, respectively. The same operator control stations 7 and 8 are shown in Figure 1, as well as a control panel 25 which houses the timers and selectors.

It will be clear that the circuits of either Figure 2 or Figure 3 can be used in connection with this arrangement. The two motors 1 and 2 of these circuits would be replaced by the single motor 21, while the magnetic clutch coils 4a, 4b, 6a and 6b would be replaced by the single operating coils of the controls 23 and 24, and the double coils of control 22. Figures 5 and 6 have been drawn, however, to show specific circuits for this arrangement, and to show in addition, a simplified arrangement of the timers. Figure 5, for example, while quite similar to Figure 3, shows that all the timers 14a to 14d may be driven by the single synchronous motor 26. The driving connection between this motor and the timer is indicated diagrammatically by the dashed line 27. A fuller description of this interconnection of the timer drive will be given later.

In Figure 6 is shown a still further simplified timer control. Only one timer, designated 28, is used. The operator, rather than the job setter, would position this timer to control the cuts on the work piece, and would do so prior to each cut.

As one of the measures of economy, this single timer is driven, not from a separate synchronous motor, but from the same synchronous motor which is used to drive the lathe itself. The dashed line 29 indicates this driving connection.

It will be noted that there has also been eliminated from the circuit the several relays associated with the timing controls in the previous circuit. Instead of these relays, there are simply provided double-pole switches 30a to 30d. Each of these switches, when actuated by the operator, establishes two circuits. One of these circuits is through the clutch 17 of the timer 28 for starting a time period, and the other is through the contact points 18 of the timer, and one of the selector switches 31a to 31d, to the controls of the apron. It will be noted that the selector switches, both in Figure 6 and in Figure 5, include two blades, one for selecting the direction of feed, and the other for selecting length or cross feed.

After the operator has set the timer 28 for a particular cut on the work piece, he throws one of the switches 30 to 30d, and the tool immediately commences its cut. At the termination of the time period, the contact points 18 are broken so that the circuit through the selector switch and the apron controls is also broken. The cut being thus finished, the operator opens the same switch which he had closed to start the cut, doing which breaks the circuit through the clutch 17 so that the timer may be automatically reset. To start the next cut he sets the timer 28 again, and then closes the next double-pole switch in the series.

Figures 4, 5 and 6 include a feature which is not particularly concerned with the timing of lathe cuts, and which may be used in any of the circuits except those which are full automatic in operation. Referring to Figure 4, this feature is shown as including a multiple tool turret 32, and a motor mounted on the compound feed screw, and numbered 33. This motor is of the reversible stall type, and is energized along with the motor 21 by the closing of the hand switch 7a. A switch box 34 mounted on the motor itself is used to reverse the direction of rotation of the motor.

The compound slide is reciprocated to and from the work by the stall motor 33 between accurately located mechanical stops, not shown in the sketch. At the end of each cut, or, whenever it is necessary to change tools, the operator presses the reverse button at the control box 34, thus driving the motor 33 in a direction to remove the tool from the work, the withdrawal motion taking place until the compound slide strikes one of the stops, at which time the motor 33 is forcibly stopped. With the tool thus withdrawn, the operator swings the turret and clamps the new tool in place. He then presses the forward button at the control station 34 to reverse the stall motor and to move the tool forwardly into cutting position. The location of the tool in its forward position is determined by the other mechanical stop against which the motor 33 again stalls. Each tool when moved forward occupies a position near that occupied by the previous tool at the end of its cut, the exact position being determined by the angle and extension of the tool in the turret 32.

Figures 7, 8, 9 and 10 are detailed drawings of the operator's control shown as 8 in Figure 1. The purpose of this device is to make possible the operation of the lathe by a totally unskilled workman, and to prevent any errors in the actuation of the succeeding cuts on the work piece. All that confronts the workman is the circular track 35 and the slidable push button 36. He is instructed to start an operation by pushing button 36 at the number one or top position of the circular track; to wait until the first cut is finished and then to slide push button 36 to the number two position and to push it again at that position; to repeat this procedure until the last cut is made and then to grasp the button 36 pulling it outwardly and moving it on around the circular track and back to the number one position.

Means are provided to prevent the operator from moving the button in a backward or counterclockwise direction, to prevent him from moving the button past one of the cycling positions without actuating it, and to prevent him from actuating the button at a given cycling position a second time. These means are best shown in the sectional view of Figure 8. In this view the mechanism is shown in a position that is reached when the operator moves the button up to a new cycling position and is ready to press the button and thereby start a cut on the work piece. The button 35 is pinned at 37 to a plunger 38. The lower end of this plunger has a tapered head 39 and a cylindrical tip 40. This tip is adapted to enter a socket 41 in the spring pressed switch plunger 42, so as to push this plunger 42 into electrical engagement with the contact point 43. As plunger 42 is moved downwardly, the blade 44, which in Figure 8 is seen pressing against the upper end of this plunger, is moved over the upper end of the plunger and against the tapered side 39 of plunger 38. This movement is caused by a spring 45 bearing against a slide 46, located in the block 47 and carrying the blade 44 at 48. After the blade 44 has moved into the position just mentioned, and further downward thrust of the push button is continued the blade merely rides back along the tapered surface 39 of plunger 38. When the operator removes his finger from the push button and spring 49 returns plunger 38 to its upper position, blade 44 completes its movement toward the right and offers a positive barrier to a second attempt to actuate the switch. The tip 40 on plunger 38 insures that the push button will not be locked on its first downward thrust by the blade 44.

Two of the foolproof features of the device have appeared in the above discussion. The first is the stop provided by the blade 44 in bearing against the upper end of plunger 42, this stop preventing the operator from the accidental moving of the push button past any cycling position. The second of these features is the prevention of double actuation of any one switch. The third foolproof feature, that of preventing backward movement of the button along the circular track, is effected by the hooked end 50 of the blade 44 in engaging the right side of plunger 42 at its upper end after that plunger has once been pressed to effect the starting of the lathe cut.

Figure 9 which is a section taken on the line 9—9 of Figure 8, shows how the block 47 fits between the sides of the track 35, and also shows how this block is bored to receive the slide 46 with its blade 44.

Figure 10 is a section on line 10—10 of Figure 8, showing how the block 47 as well as the plate 47a are confined within the track 35. The blade 44 also shown in its lockout position in this view, between plungers 38 and 42. The two compression springs which separate the block 47 and the plate 47a function to offer a certain amount of frictional resistance to movement of the push button unit along the circular track 35, to lift plunger 38 to its upper position after actuation by the operator, and to permit return of the push button unit to starting position after the last cut on the work piece has been made.

In connection with the last function, the operator grasps the push button and pulls it outwardly, this motion causing the head 39 of plunger 38 to lift block 47 away from the bottom of the track. Since the block 47 carries blade 44, this blade is also lifted, so that it clears the heads of plungers 42, and permits quick sliding of the push button unit over the unused portion of the track to the starting position.

Figures 11, 12 and 13 show details of the timer shown diagrammatically in the circuit of Figure 5, this timer having the multiple individual cycling units 14a to 14d, but being driven by the common synchronous motor 26. In Figure 11 only two of the individual units 14a and 14b are shown, but it is obvious that any desired number may be mounted upon the common shaft. It is also obvious that between motor 26 and shaft 27 there would be interposed necessary reduction gearing.

Each of these individual units 14a and 14b consists essentially of the clutch mechanism 17, the breaker points 18 which are positioned manually with respect to the dial 71, and a trip arm 52 carried by the free half of the clutch and serving to open the breaker points 18 at the end of a predetermined time period. The clutch mechanism 17 consists of a solenoid 53, opposed in action by a spring 54, both of which are attached mechanically to a clutch yoke lever 55 for shifting the clutch half 56 which is keyed to shaft 27. When the clutch is engaged as shown in Figure 11, the clutch member 56 is engaged with the clutch half 57 which carries the trip arm 52. A torsion spring 58, interposed between the clutch half 57 and a stationary point, acts upon this clutch member 57 to urge it in a rotative direction opposite to that of the motor 26. Thus, when the clutch is disengaged at the end of a cycling period by the deenergization of solenoid 53 and the action of spring 54, the torsion spring 58 will return clutch member 57 and trip arm 52 to a fixed starting position against a mechanical stop 59.

Referring now more particularly to Figures 12 and 13, the means for positioning the contact points 18 with respect to the dial 71 consists of an arm 60 upon which is mounted the contact points 18, a hairline 61 registering with the graduations of dial 71 and being marked upon the overturned upper end of arm 60, and a knurled adjusting screw 62 which threads into a clamping plate 63 on the underside of dial 51 for locking the arm 60 and contact points 18 at the desired reading along dial 71. A plan view of this dial appears in Figure 13 in developed form, and for illustrative purposes is shown graduated in seconds and fractions thereof.

Summarizing briefly the use and operation of the timer just described, the job setter positions the hairline 61 of the several arms 60 along the several dials 71 to time, and therefore to measure each of the cuts on the work piece. In so doing he moves the normally closed points 18 a definite angular distance away from the trip arms 52, which are all located against their stops 59 when in non-operative position by torsion springs 58. All of the individual cycling units 14a, 14b, etc. being thus positioned by the job setter, the operator puts each of these units into action in successive order according to the particular circuit arrangement of the controls, for example by the circular cycling controller 8, or the full automatic push button 19. Actuation of the controls by the operator energizes one of the solenoids 53 which results in closing the clutch member 56 against the mating clutch member 57 through the medium of the clutch arm 55. This engagement of the clutch causes the motor drive to be picked up from shaft 27 and transmitted to the trip arm 52, whereupon this arm leaves the stop 59, and after a definite time period, engages the contact points 18 to open them and to break the circuit which is causing the tools to make a pass over the work. Simultaneously with the breaking of this circuit, solenoid 53 is deenergized and spring 54 causes the disengagement of the clutch members 56 and 57, with the result that the trip arm 52 is returned to its starting position against stop 59 by the tension of torsion spring 58. If the circuit is designed for full automatic operation, the trip arm 52 will be adapted to engage, in addition to the normally closed contact points 18, another pair of normally opened contact points like those shown at 20 in Figure 3, for the purpose of energizing, without the closing of a switch by the operator, the next solenoid 53 in the succession.

It will be understood that this invention is applicable to a wide variety of mechanisms and that the use of the term "lathe" is only typical of the machines which may be so operated and utilized.

It will be understood that we desire to comprehend within our invention such modifications as come within the scope of the claims and the invention.

Having thus fully described our invention what we claim as new and desire to secure by Letters Patent is:

1. In a method of operating a lathe, rotating the work piece, presetting a series of sequential electrical control means to determine the sequential direction of movement of a cutting tool with respect to the work piece longitudinally and transversely, driving the work tool at a constant speed longitudinally and transversely with respect to the work piece, electrically timing the period during which the cutting tool moves during each preselected movement to control the length of cut thereof and thereafter successively closing each one of said preselected and pretimed circuits whereby a work piece is cut to the desired configurations.

2. In a method of cutting a work piece in a lathe, rotating the work piece, moving a cutting tool with reference to the longitudinal and transverse axis of the work piece, effecting said movements at a constant speed and electrically timing each of said movements to a predetermined duration to control the length of each cut.

3. In a method of cutting a work piece in a lathe, rotating the work piece, moving a cutting tool with reference to the longitudinal and transverse axis of the work piece, effecting said movements at a constant speed, electrically timing each of said movements to a predetermined duration, manually selecting the sequence of said movements, and automatically terminating each of said successive movements according to the setting of the timing to control the length of each cut thereby.

4. In a lathe, means for rotating a work piece, synchronous motor means for moving a cutting tool longitudinally and transversely of said work piece, means of disconnecting said motor means from said respective transverse and longitudinal tool moving means, means of preselecting electrically the order of cuts by said cutting tool as to direction of movement of cutting tool with respect to the longitudinal and transverse axis of the work piece and means of preselecting the timing of said respective cuts by the work piece.

5. In a lathe, means for rotating a work piece, synchronous motor means for moving a cutting tool longitudinally and transversely of said work piece, means of disconnecting said motor means from said respective transverse and longitudinal tool moving means, means of preselecting electrically the order of cuts by said cutting tool as to direction of movement of cutting tool with respect to the longitudinal and transverse axis of the work piece, means of preselecting the timing of said respective cuts by the work piece, and means of selectively closing electrical circuits so controlling the movement of the cutting tool and the time of operation thereof in each movement.

6. In a lathe, means for rotating a work piece, synchronous motor means for moving a cutting tool longitudinally and transversely of said work piece, means of disconnecting said motor means from said respective transverse and longitudinal tool moving means, means of preselecting electrically the order of cuts by said cutting tool as to direction of movement of cutting tool with respect to the longitudinal and transverse axis of the work piece, means of preselecting the timing of said respective cuts by the work piece, and means of selectively closing electrical circuits so controlling the movement of the cutting tool and the time of operation thereof in each movement, and means associated with said circuit closing means adapted to prevent the closing of any but a single selected circuit in a predetermined sequential order.

7. In a lathe, means for rotating a work piece, synchronous motor means for moving a cutting tool longitudinally and transversely of said work piece, means of disconnecting said motor means from said respective transverse and longitudinal tool moving means, means of preselecting electrically the order of cuts by said cutting tool as to direction of movement of cutting tool with respect to the longitudinal and transverse axis of the work piece, means of preselecting the timing of said respective cuts by the work piece, and means of selectively closing electrical circuits so controlling the movement of the cutting tool and the time of operation thereof in each movement, means associated with said circuit closing means adapted to prevent the closing of any but a single selected circuit in a predetermined sequential order, and means associated with said circuit closing means to prevent multiple operation of a selected circuit in any one cycle of operations.

8. In a lathe, means for rotating a work piece, synchronous motor means for moving a cutting tool longitudinally and transversely of said work piece, means of disconnecting said motor means from said respective transverse and longitudinal tool moving means, means of preselecting electrically the order of cuts by said cutting tool as to direction of movement of cutting tool with respect to the longitudinal and transverse axis of the work piece, means of preselecting the timing of said respective cuts by the work piece, and means of selectively closing electrical circuits so controlling the movement of the cutting tool and the time of operation thereof in each movement, means associated with said circuit closing means adapted to prevent the closing of any but a single selected circuit in a predetermined sequential order, and means associated with said circuit closing means to prevent multiple operation of a selected circuit in any one cycle of operation, and means to prevent said selector being reversed after having once been initiated in a cycle of operations to prevent confusion of selection of circuits.

9. In a system of sequential controlled mechanism, means for moving a controlled mechanism longitudinally and transversely of a given axis, means to selectively predetermine the sequence of longitudinal and transverse movements, means to time said selected sequential movements so as to regulate the period of each, and means of successively closing each of the electrical circuits so preset as to longitudinal or transverse movement and preset as to time of movement whereby said movements will be successively initiated and performed.

10. In a system of sequential controlled mechanism, means for moving a controlled mechanism longitudinally and transversely of a given axis, means to selectively predetermine the sequence of longitudinal and transverse movements, means to time said selected sequential movements so as to regulate the period of each, and means of successively closing each of the electrical circuits to preset as to longitudinal or transverse movement and preset as to time of movement whereby said movements will be successively initiated and performed, and means to prevent during said selection last mentioned the selection a second time of any circuit once selected and means of preventing a reversal of selecting means after initiation of a cycle.

11. In a method of operating a machine having longitudinal and transverse movements, the step (a) of effecting said movements at substantial constant rates of speed; the step (b) of preselecting the direction of said movements whether longitudinal or transverse of said respective longitudinal and transverse moving mechanisms and whether said mechanisms will move to the right or left or in and out; the step (c) of timing the duration of each of said movements to control the length of each of said movements; and the step (d) of stopping one of said movements at the end of its time period and initiating the next successive movement whereby after initial selection and setting the sequence of movements will be timed for controlling the length of each movement and will be automatically performed.

12. In a method of operating a lathe for performing in sequential timed relationship longitudinal and transverse cuts on a work piece first as a rough cut and thereafter repeating as a finishing cut, the step (a) of moving the cutting tool for the roughing operation longitudinally and transversely at a constant speed; the step (b) of pre-setting a series of electrical control means preselecting said movements; the step (c) of pretiming said movements to control the length thereof by the time allowed for each movement; the step (d) of closing the circuits controlling said movements successively so that the movements are performed as to direction in the predetermined selected manner for the predetermined selected periods of time; the step (e) of reversing the position of the cutting tools to then present a finishing tool to the work; and thereafter the step (f) of repeating the operation with the same setting and timing.

13. In a timing mechanism for operating the longitudinal and transverse movements of a cutting tool on a lathe, means for moving the cutting tool at a substantially constant speed, means for selecting the direction of movement of the cutting tool in successive cutting steps, means comprising a master timer for timing the period of each of said movements in succession, means comprising selector switches for successively closing the circuits of each of the means controlling the selected tool movements and means comprising the common circuit interrupter controlled by said timer for terminating the selected tool movements.

14. In a lathe, means for moving a workpiece, motor means for moving a cutting tool longitudinally and transversely of said workpiece at a constant speed, means for rendering inoperative said motor means with respect to said transverse and longitudinal tool moving means, means selecting electrically the order of cuts by said cutting tool as to direction of movement of said cutting tool with respect to the longitudinal and transverse axis of the workpiece, and means preselecting the timing of said respective cuts by the workpiece.

GEORGE J. WINTERMUTE.
DAVID E. BENCH.